Figure 1:
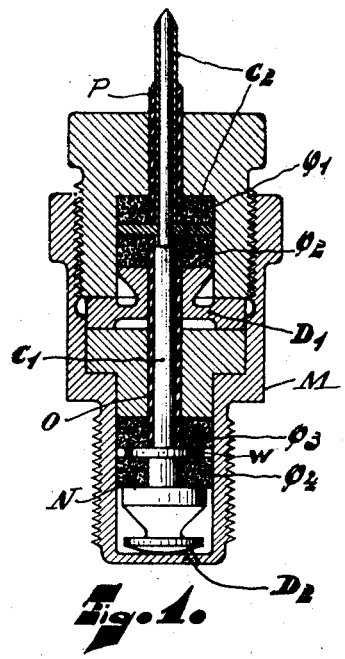

July 29, 1941.   F. POSTLETHWAITE   2,250,496

PRESSURE MEASURING DEVICE

Filed June 16, 1938

INVENTOR
Frank Postlethwaite

BY
ATTORNEY

Patented July 29, 1941

2,250,496

UNITED STATES PATENT OFFICE 2,250,496

PRESSURE MEASURING DEVICE

Frank Postlethwaite, Farnborough, England, assignor, by mesne assignments, to Hartford National Bank and Trust Company, Hartford, Conn., as trustee Application June 16, 1938, Serial No. 214,154
In Great Britain June 22, 1937

2 Claims. (Cl. 171—327)

This invention relates to electrical systems used for the measurement of gas pressure in the cylinders of internal combustion engines. The invention has especially for its object to provide an improved apparatus for the measurement of detonation and knock, but it is applicable to other analogous apparatus for indicating pressure changes. The invention relates more particularly to electrical systems in which the pick-up unit is in contact with the cylinder gases.

In known form of such electrical pick-up unit, the required sensitivity to pressure fluctuations is accompanied by an unwanted sensitivity to mechanical vibration which renders them inaccurate for use on most engines, since a certain amount of mechanical vibration is always present. In particular, known forms of electrical pick-up units are unsuitable on this account for use on high-duty aero-engines where mechanical vibration is present to a high degree. I have discovered a method whereby pick-up units can be so constructed as not to respond to mechanical vibration, whilst still retaining unimpaired sensitivity to the effect of variations in gas pressure.

Further, with known systems of amplifier or recorder for use with the pick-up unit, it is extremely difficult to assess the degree of detonation present in the cylinder of a petrol engine or the degree of knock present in the cylinder of a Diesel engine, because the desired electrical information regarding detonation or knock is accompanied by electrical information appertaining to the normal pressure cycle of the engine. I have found that detonation and Diesel-knock are made up of much higher frequencies than those associated with the normal pressure cycle, and for this reason it is possible to separate the detonation and Diesel-knock signals from the mixed signal delivered from the pick-up unit by an electrical filter.

According to the first part of my invention, the electrical pick-up or pressure-responsive unit is arranged to respond to fluctuations of pressure in the engine cylinder, but to have no response to the mechanical vibrations of the engine. This is effected by the use of two systems to form the pick-up unit, namely, the pressure system and the vibration system. The pressure system is acted on by the cylinder gases, and responds to both fluctuations in the pressure of the gases and to the mechanical vibration of the engine. The vibration system is dynamically similar to the pressure system and is placed preferably above the pressure system in the pick-up unit. The vibration system is not in contact with the cylinder gases and responds only to mechanical vibration. The electrical outputs of the two systems are so connected that the vibration outputs cancel one with the other, and thus the pressure output remains as the net output from this new form of pick-up unit. This electrical signal is then delivered to the measuring and filtering circuit which forms the second part of my invention.

Since I have discovered that both detonation and Diesel knock are associated with much higher frequencies than those appertaining to the normal pressure cycle, it is possible to arrange a band-pass filter so as to attenuate all frequencies not associated with these two effects. By way of example, I have found that, for aero-engines at present in use it is sufficient to respond over a frequency band extending from 2,000 to 20,000 cycles per second, to embrace all frequencies associated with detonation in these engines. With such a band-pass filter in the measuring instrument it is thus possible to separate the electrical output corresponding to detonation effects from the gross output of the pick-up unit. The amplitude of the detonation signal thus obtained can be measured from observation on a cathode ray oscillograph screen, or be measured by using a gas discharge triode as a peak voltmeter.

According to one form of my invention, the pick-up unit may be constructed to use two pairs of piezo-electric quartz crystals. One pair is used in the pressure system and the other pair is used in the vibration system. Both systems are dynamically similar, and under the influence of vibration the two crystal systems develop equal and opposite electrical charges. Connection is made between the two systems, and hence one charge cancels out the other. As one set of crystals alone are subjected to the fluctuations of the cylinder gas pressure, the sensitivity of the pick-up unit to pressure is unaffected by the neutralising of the mechanical vibration effects. The band-pass filter may take forms well known in the art, but the preferred form is for the amplifier to incorporate simple high-pass and low-pass filters in such a manner as to obtain the desired band-pass response. The degree of detonation or degree of Diesel-knock is obtained by measuring electrically the amplitude of the amplified and filtered signal.

Figure 2:
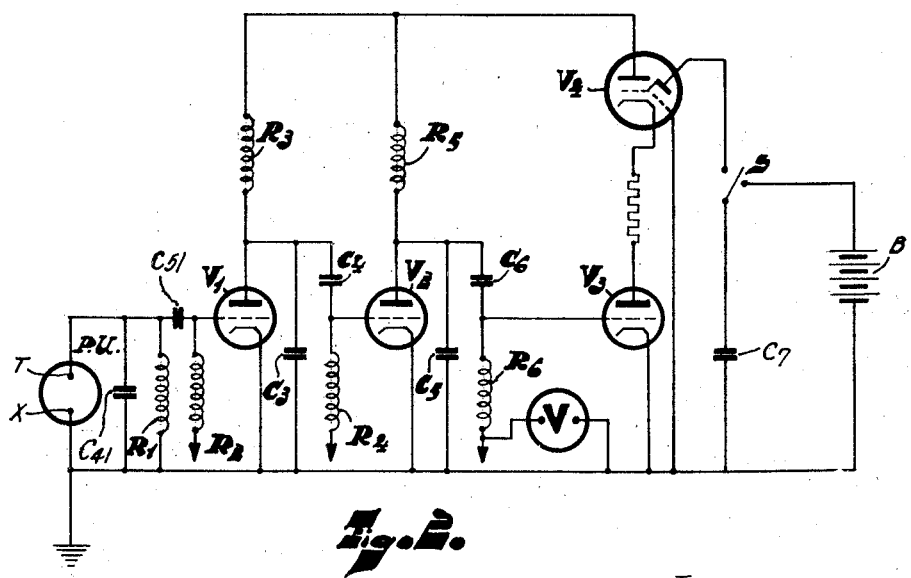

In order that the invention can be clearly understood and readily carried into effect, I shall describe the same in more detail with reference to the accompanying drawing in which, Figure 1 is a side view in section of a pressure-responsive unit according to the invention, and Fig. 2 is a schematic diagram of a circuit for use with the unit of Figure 1.

The pressure-responsive unit shown in Figure 1 comprises a housing M having an end portion D2 serving as a pressure diaphragm. A member D1 serves as a vibration diaphragm. Within housing M are four piezo-electric quartz crystals Q1, Q2, Q3 and Q4. Crystals Q1 and Q2 together with the vibration diaphragm D1 form the vibration system, whilst crystals Q3 and Q4 with the pressure diaphragm D2 form the pressure system. The unit is screwed, for instance, into an opening in the cylinder of an internal combustion engine so that the pressures of the gas therein will be applied to the bottom surface of the diaphragm D2 and transmitted to the crystals Q3 and Q4. For this purpose a metal member or electrode C1 has its lower end bearing upon the upper surface of diaphragm D2 and is provided with a shoulder N bearing upon the lower surface of the crystal Q4. Electrode C1 is also provided with a disc W located between the crystals Q3 and Q4. The charge produced in crystals Q3 and Q4 is fed along the electrode C1 which is insulated from the body of the unit. For this purpose the upper end electrode C1 extends with a sliding fit through a tube O of insulating material. Crystals Q1 and Q2 are similar to crystals Q3 and Q4, and press against the vibration diaphragm D1. The crystals in the vibration system are arranged to produce an equal and opposite polarity of charge to that produced by vibration on the crystals comprising the pressure system. Thus if the pick-up unit is vibrated along its axis the charge produced by crystals Q1 and Q2 cancels the charge produced by crystals Q3 and Q4. The outer faces of the pairs of crystals are connected electrically through the medium of the metal body of the unit, whilst the inner faces are connected electrically by the means of electrodes C1 and C2. Electrode C2 consists of a disc-shaped portion extending between the crystals Q1 and Q2, and a tubular portion through which the electrode C1 extends with a sliding fit. A tube P of insulating material surrounds electrode C2 and insulates the same from the housing M. Thus electrodes C1 and C2 are in metallic contact one with the other, but are electrically insulated from the body of the unit. With the arrangement described the pick-up unit is rendered free from the effects of vibration, whilst remaining responsive to pressure fluctuations applied to the diaphragm D2. It will be noted that the pressure impulses transmitted to electrode C1 will not act upon the crystals Q1 and Q2 because the electrode C1 is in sliding contact with the tube O and the tubular electrode C2, i. e. electrodes C1 and C2 are free to move relatively to each other.

To measure the degree of detonation or knock present in the engine on test, the output of the pick-up unit is fed to the filter circuit which forms the second part of my invention. One form of filter circuit is as shown in Fig. 2, where it will be seen that the filter comprises two thermionic valves V1 and V2 for amplifying the voltages produced by the pick-up unit P. U. of Figure 1 whose grounded terminal formed by housing M is indicated by reference letter X, and whose other terminal, i. e. the connection to the inner surfaces of both pairs of crystals, is indicated by the reference letter T. The circuit also includes a gas-discharge thermionic valve V3 used as a peak voltmeter in conjunction with the voltmeter V. The system includes three high-pass filters formed by condenser C41 and inductance R1, condenser C51 and inductance R2, and condenser C4 and inductance R4; also three low-pass filters formed by condenser C6 and inductance R6, condenser C3 and inductance R3, and condenser C5 and inductance R5. The values of the filters are chosen so that only the desired band of frequencies is passed on to the grid of V3.

The degree of detonation or knock is measured by determining the voltage of the amplified and filtered signal on the grid of V3 in manners well known to the art. The preferred method is to use a voltmeter V to measure the bias necessary to prevent V3 from being triggered by the grid voltage pulse from the anode of V2. A tuning indicator V4 is used to give a visible indication of current flow through V3.

The tuning indicator V4 can be used to reset the gas-discharge valve V3 after it has been triggered once, and for this purpose a condenser C7 and a single-pole switch S are provided. With switch S open valve V3 will continue to pass current after once being triggered by a voltage pulse on its grid, but with switch S closed valve V3 discharges the condenser C7 until the voltage across C7 is too low to maintain a current flow through the valve V3. The current flow through V3 ceases and the valve is then set for a second discharge. Thus, with switch S closed the voltage measuring circuit is automatically reset. Condenser C7 is charged by means of a battery B.

Having now particularly described and ascertained the nature of my said invention and in what manner the same is to be performed, I declare that what I claim is:

1. A device for measuring fluctuations in the pressure of the gas in an internal combustion engine comprising a hollow housing having a diaphragm portion adapted to be placed with one surface in contact with the gas whose pressure is to be measured, a piezo quartz crystal within the housing, a member actuated by said diaphragm portion and bearing upon said crystal to compress the same, a second crystal within said housing, a member responsive only to mechanical vibration and bearing upon said second crystal to compress the same, and means connecting said crystals so that they produce equal and opposite charges due to vibration, said means comprising an electric connection between a surface portion of each of said crystals, and a second electric connection between another surface portion of each crystal, the surface portions of each crystal being separated from each other.

2. A device for measuring fluctuations in the pressure of the gas in an internal combustion engine comprising a hollow housing having a diaphragm portion adapted to have one surface placed in contact with the gas whose pressure is to be measured, a pressure system within the hollow of said housing and comprising two piezoelectric crystals, a contact member between said crystals and bearing upon portions of the adjacent surfaces thereof, a member bearing upon said diaphragm portion and the surface of one of said crystals to compress said crystals in accordance with the movement of said diaphragm portion, a vibration system comprising two piezoelectric crystals, a contact member between said latter two crystals and bearing on portions of the adjacent surfaces thereof, means to compress said latter two crystals in accordance with the mechanical vibrations in the device comprising a vibration member adapted to be moved only by vibrations in the device, an electrical connection between said two contact members, and an electical connection between surface portions of the latter crystals other than the adjacent surfaces.

FRANK POSTLETHWAITE.